(12) United States Patent
Shields

(10) Patent No.: US 9,122,143 B2
(45) Date of Patent: Sep. 1, 2015

(54) DYNAMICALLY VARIABLE GRAPHIC MATERIAL USING ELECTROSTATICALLY ATTRACTED PARTICLES

(71) Applicant: Rodney M. Shields, Ukiah, CA (US)

(72) Inventor: Rodney M. Shields, Ukiah, CA (US)

(73) Assignee: MINDFLOW LLC, San Franciscio ( * ) Notice: Subject to any disclaimer, the term of this patent is extended or adjusted under 35 U.S.C. 154(b) by 0 days.

(21) Appl. No.: 13/913,275

(22) Filed: Jun. 7, 2013

(65) Prior Publication Data

US 2013/0335809 A1 Dec. 19, 2013

Related U.S. Application Data

(60) Provisional application No. 61/656,681, filed on Jun. 7, 2012.

(51) Int. Cl.
*G02B 26/00* (2006.01)
*G09G 3/34* (2006.01)
*G03B 21/60* (2014.01)
*B44F 1/10* (2006.01)
*B44F 7/00* (2006.01)
*G02F 1/167* (2006.01)
*G03B 21/28* (2006.01)
(Continued)

(52) U.S. Cl.
CPC ............... *G03B 21/60* (2013.01); *B41M 3/003* (2013.01); *B41M 5/0047* (2013.01); *B41M 5/0064* (2013.01); *B44F 1/06* (2013.01); *B44F 1/10* (2013.01); *B44F 7/00* (2013.01); *G02B 26/026* (2013.01); *G02F 1/167* (2013.01); *G03B 21/28* (2013.01); *G09G 3/34* (2013.01); *G09G 3/344* (2013.01); *G09G 3/3453* (2013.01); *B42D 25/324* (2014.10); *B42D 25/328* (2014.10); *B42D 2033/18* (2013.01); *B42D 2035/36* (2013.01); *G09G 3/2003* (2013.01); *Y10T 428/24802* (2015.01)

(58) Field of Classification Search
CPC ...... G02B 26/00; G02B 26/026; G02F 1/167; G02F 1/172; G02F 2001/1676; G02F 2001/1678; G09G 3/34; G09G 3/344; G09G 3/446; G09G 3/3453; G09G 3/2003; G09G 2300/0426; G09G 2320/0252; B44F 1/00; B44F 1/06; B44F 1/08; B44F 1/10; B44F 7/00; B32B 2457/20
USPC ........... 359/245, 254, 296; 345/107; 313/505, 313/506, 509; 315/12.1, 500, 501, 506; 422/50, 82.01
See application file for complete search history.

(56) References Cited

U.S. PATENT DOCUMENTS 3,293,473 A * 12/1966 Anderson ..................... 313/395
4,673,609 A 6/1987 Hill
(Continued)

*Primary Examiner* — Loha Ben
(74) *Attorney, Agent, or Firm* — Anthony J. Patek; Gutride Safier, LLP

(57) ABSTRACT

Dynamically-variable graphic displays, including a panel comprised of colored microspheres, each a single pixel with an embedded electrical charge; one or more electrodes capable of receiving an electrical charge, each electrode situated so that it can interact with at least one of said microspheres; an energy source connected to the electrodes via conductive elements capable of changing the polarity of said electrodes, such change in polarity causing the microspheres to move to change the color displayed to a viewer; and a substrate. Also included within the invention are dynamically-variable graphic display panels that enable one-way graphics through distribution of pixels to create image and silhouette patterns, wherein the image pattern is visible from the front of the panel under conditions of illumination, and wherein the silhouette pattern creates a substantially transparent area of clear vision from the back of the display panel through the panel.

22 Claims, 18 Drawing Sheets

(51) Int. Cl.
  G02B 26/02 (2006.01)
  B44F 1/06 (2006.01)
  B41M 3/00 (2006.01)
  B41M 5/00 (2006.01)
  G09G 3/20 (2006.01)
  B42D 25/324 (2014.01)
  B42D 25/328 (2014.01)

(56) References Cited

U.S. PATENT DOCUMENTS

| | | |
|---|---|---|
| 5,463,491 A | 10/1995 | Check |
| 5,609,938 A | 3/1997 | Shields |
| 5,930,026 A | 7/1999 | Jacobson |
| 6,606,185 B2 | 8/2003 | Saxe |
| 6,824,639 B1 | 11/2004 | Hill |
| 7,190,008 B2 | 3/2007 | Amundson |
| 7,848,006 B2 | 12/2010 | Wilcox |
| 8,361,385 B2 * | 1/2013 | Glezer et al. .................. 422/50 |
| 8,384,658 B2 | 2/2013 | Albert |
| 8,390,301 B2 | 3/2013 | Danner |
| 8,790,578 B2 * | 7/2014 | Wohlstadter et al. ...... 422/82.01 |
| 2009/0122389 A1 | 5/2009 | Whitesides |
| 2011/0292319 A1 | 12/2011 | Cole |
| 2011/0310461 A1 | 12/2011 | Bouchard |
| 2012/0134009 A1 | 5/2012 | Paolini |
| 2012/0292858 A1 | 11/2012 | Telfer |

* cited by examiner

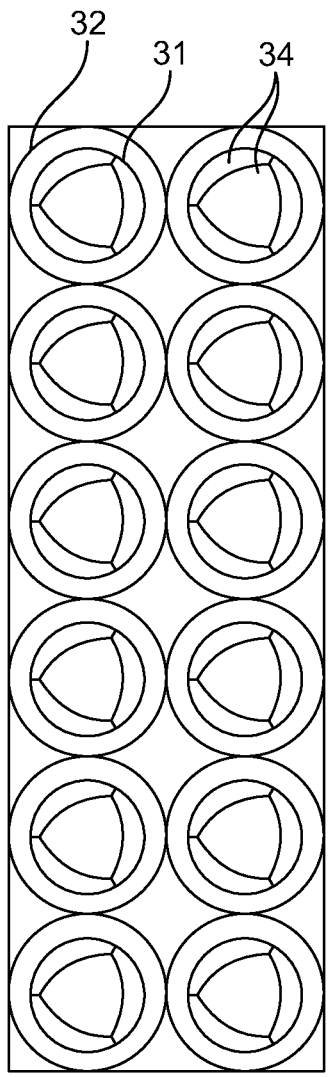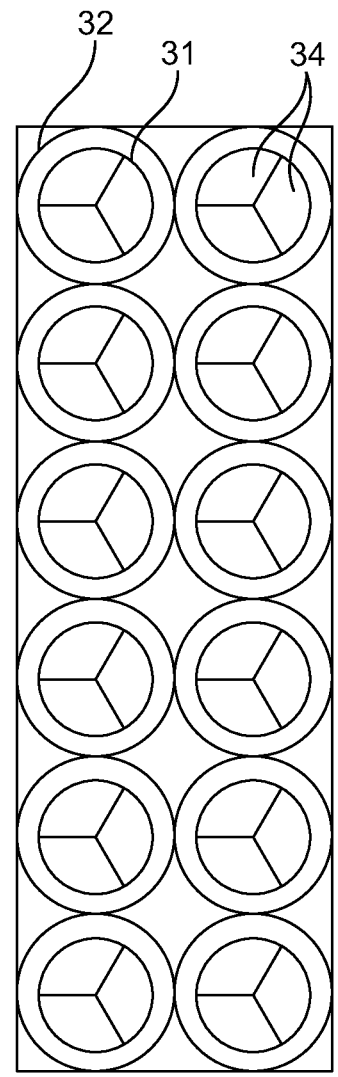
FIG. 5  FIG. 6

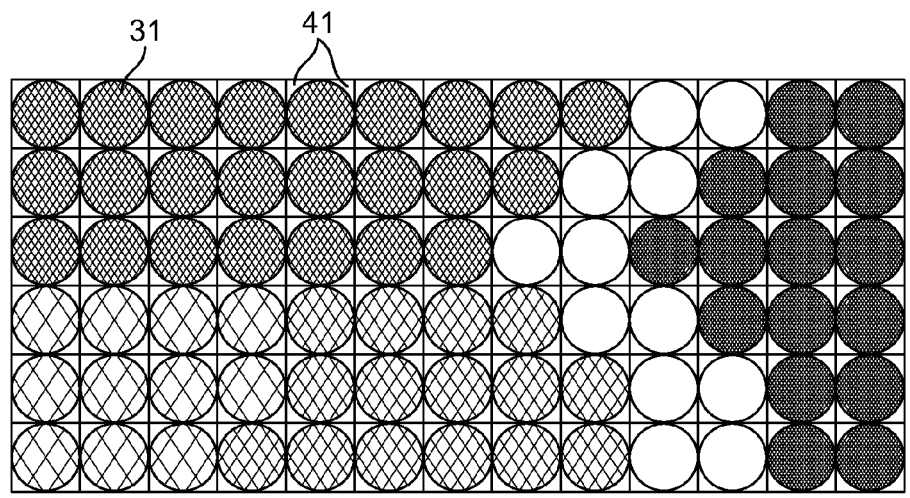
FIG. 8
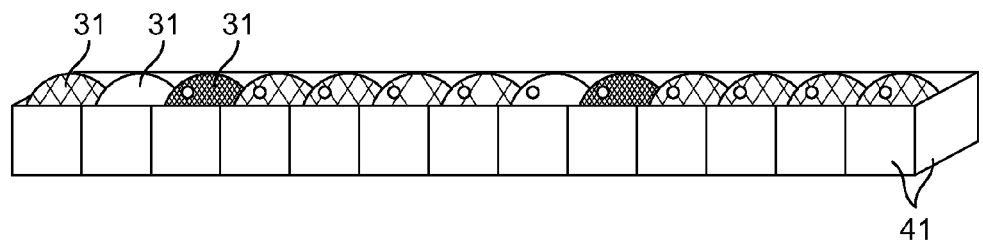
FIG. 9
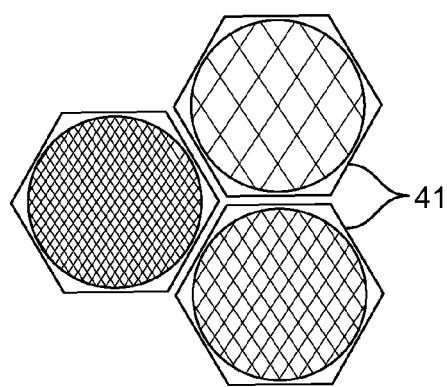   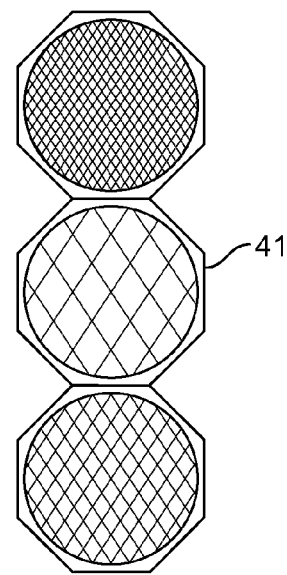
FIG. 10     FIG. 11

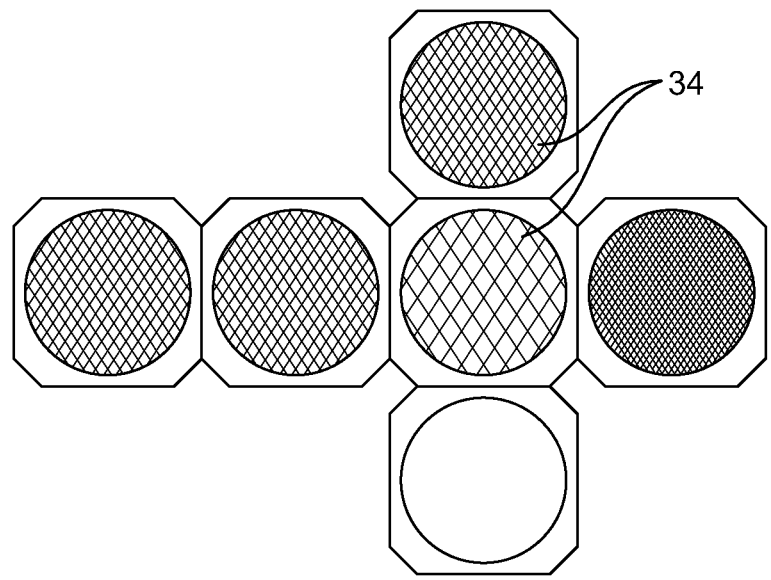
FIG. 12
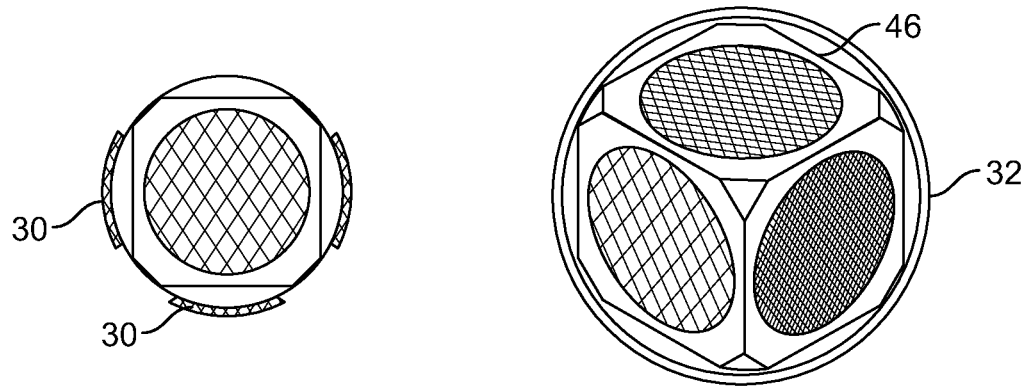
FIG. 13                    FIG. 14

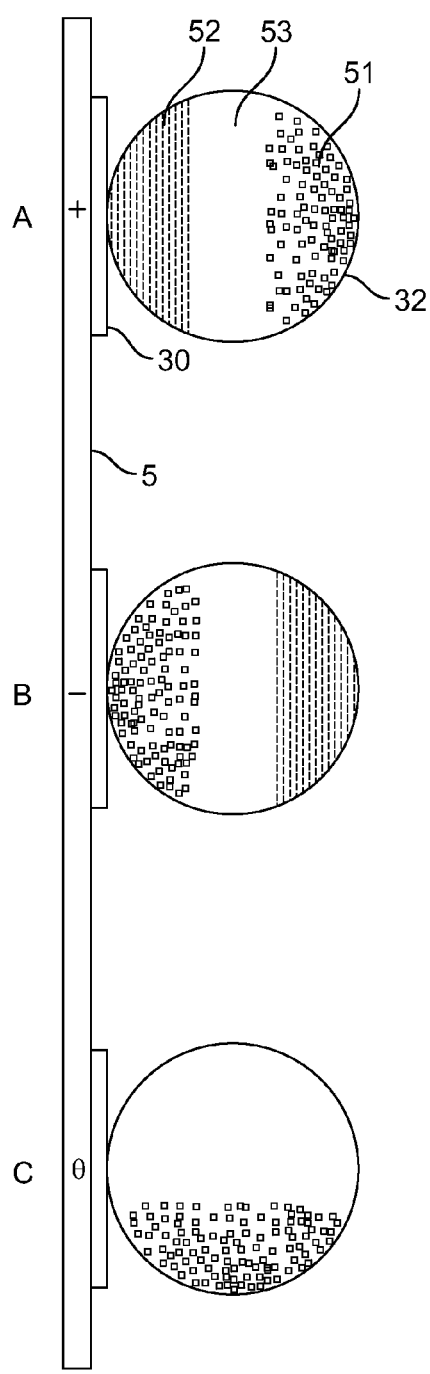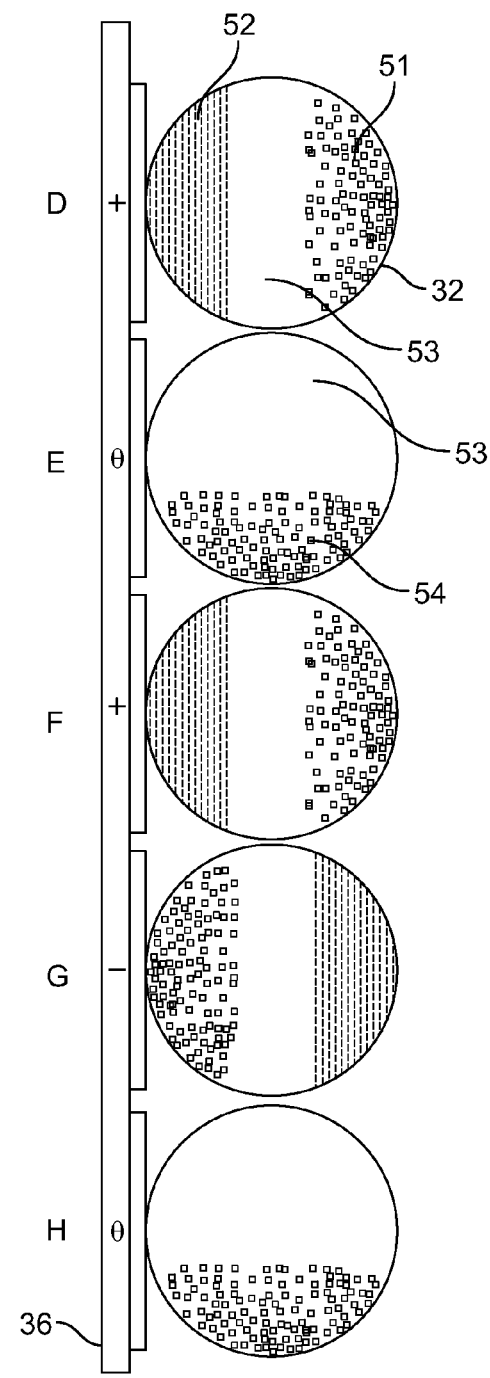
FIG. 25  FIG. 26

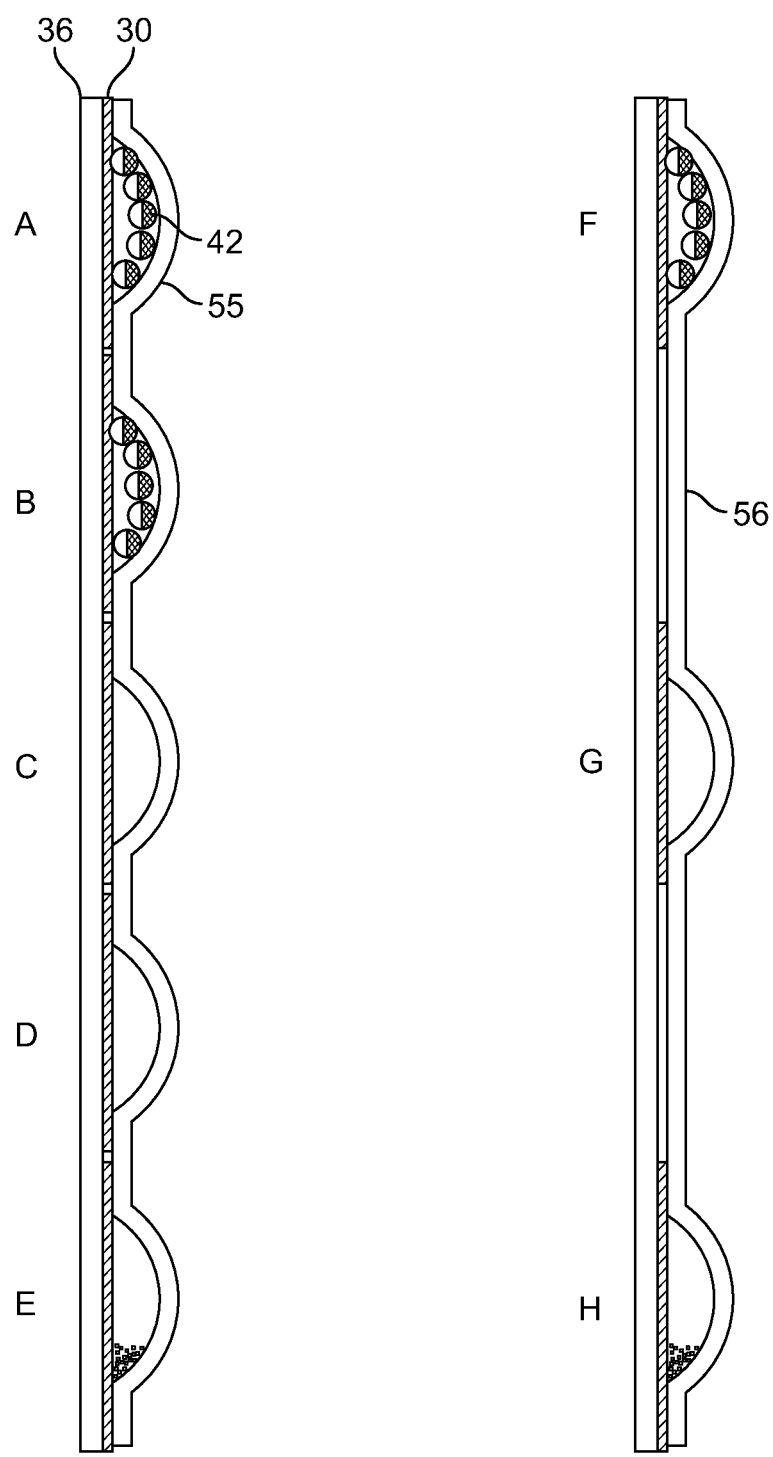
FIG. 27  FIG. 28

DYNAMICALLY VARIABLE GRAPHIC MATERIAL USING ELECTROSTATICALLY ATTRACTED PARTICLES

This invention relates to methods and apparatuses for generating dynamically variable graphic material using electrostatically and/or magnetically attracted particles. This material can be used as a flat screen display, such as a flat screen television, an electronic book, an advertising display, a computer monitor, or a fabric that changes color and/or pattern. In a preferred embodiment of the invention, a non-emissive dynamically-variable panel comprising a plurality of pixels arranged into an image pattern and a perforation pattern comprised of essentially transparent gaps in the image pattern may be layered over surfaces of storefronts, buildings, billboards, and other structures to create a one-way graphic displays for advertising and other purposes.

This utility patent application claims benefit under 35 U.S.C. §§119-120 of the filing date for application No. 61/656,681 filed Jun. 7, 2012.

BACKGROUND OF THE INVENTION

It is common practice for retail store and/or restaurants owners to paint windows with temporary and removable graphics. This type of graphic has great appeal and benefit as an advertising and promotional medium because the advertisement is displayed in the relevant location to relevant consumers (i.e., consumers outside the store and/or restaurant) and it can be changed frequently. Such graphics can be used on any glass or plastic surface, including e.g, windows, privacy screens, phone booths, bus windows, and storefronts. The popularity of this practice is evident—painted window graphics is one of the largest segments in the sign painting industry.

Yet traditional window graphics have limitations. They typically look poor from the inside of the window and block the light and view. Not being able to see out through the windows to monitor suspicious activity outside the business can have serious security problems for businesses such as banks, retail and convenience stores. Further, the paint for such graphics is typically applied to the window surface in layers of color, each color being built upon the previous color. Often multiple tools are used, including roller, airbrush, paintbrush, lettering stencils, spray equipment, or finger painting. Thus this method has the additional disadvantages of: (a) taking time and expense of skilled labor to create the displays, (b) being difficult to change and modify the graphic as desired, and (c) being difficult to clean up and remove of the graphic.

Retailers also use one-way graphic materials for store displays. One-way graphic materials are materials that have an image on one side, yet permit vision through the material from the other side. Optical properties are manipulated such that the material appears opaque from the image side, but appears substantially transparent when viewed from the non-image side. Generally, one-way graphic materials are light permeable, with one relatively dark side and one relatively light side. Images are typically placed on the light side of the one-way material. People viewing from that side will see the image. People viewing the material from the back side of the material do not see the image, but instead see the environment on the far side of the one-way graphic. Other forms of one-way graphics use transparent inks and/or retroreflective materials, and rely on differences in illumination and scale perception to create the same effect, with the image typically visible from the brighter, outdoor side of the window, while being substantially invisible from the darker, inner side of the window.

One-way graphics typically use perforated substrates, upon which an image is printed using digital printers or silk screening. Other methods of production of one-way graphics involve the application of "print patterns" of bonding material onto the surface of a transparent, non-bonding substrate, as in U.S. Pat. No. 6,267,052 (Hill et al.). Images may then be printed onto the "print pattern" of bonding material to create an image layer. One-way graphics can thus be made using non-perforated films (e.g., 3M™ Scotchcal™ Clear View Graphic Film IJ8150), wherein a print pattern simulating a perforated surface is used to create unprinted surfaces that simulate the effect of perforation.

The embodiments described above involve one-way graphic displays in which a single, permanent image is bonded to the surface of the one-way display. Because the one-way displays are entirely dye-based, as with standard window displays, they require the user to remove and replace a display each time the user wishes to display a different graphic image. Furthermore, existing technology for one-way graphic displays is entirely static, and does not allow for any movement of the image on the one-way graphic display. Thus, the current state of the art in one-way graphics also fails to take advantage of many of the advantages associated with motion pictures, television, and other video arts based on projection of images, where a single projection panel can be used to display many different types of images, and can portray motion.

Non-emissive dynamic display technologies are also known. One example is the electrophoretic display described in U.S. Pat. No. 5,930,026, commonly referred to as E Ink® This technology uses tiny microcapsules that are suspended in liquid placed within a film-like layer. The microcapsules contain both positively charged white particles and negatively charged black particles. Applying a negative electrical field to the microcapsules causes the white particles to come to the surface of the display. Conversely, applying a positive electrical field causes the black particles to come to the surface. By applying different fields at various parts of a screen, the technology produces a visual display. Besides being considered by many as easier on the eyes than emissive displays, E Ink® also boasts lower power consumption, particularly when compared to traditional backlit liquid crystal display (LCD) screens. More recent versions of E Ink include the ability to display color and multiple shades of grey. However, non-emissive displays have not been used in commercial displays, and have not been adapted to use in one-way graphic materials.

Accordingly, it is the object of the invention to provide graphic displays screens that (1) are suitable for use in commercial and retail window displays, (2) provide the opportunity to display graphics without substantially impeding vision out of windows, (3) allow easy introduction of new images without complete replacement of the display, (4) allow the user to display moving images, and (5) utilize energy efficiently. It is a further object of this invention to provide new forms of non-emissive displays using colored particulates.

BRIEF SUMMARY OF THE INVENTION

In one aspect of the invention, a one-way graphic display can be generated. Using the one-way graphic material has the benefits of the advertising and promotional value of the painted medium without any of the drawbacks. Once installed the graphics can be changed and updated quickly and easily without its removal. Further, one can see through the graphic from the back side so the view and the light are not completely blocked by the back of the painted graphic. Non-skilled labor can hook up the control unit and download an updated graphic image to the one way graphic material with microspheres. The graphic can be viewed on a computer monitor or laptop display for approval before the image is downloaded or transferred to the one way window. The one-way graphic display has many potential applications including advertisements on building and color-changing fabrics.

In another aspect of the invention, the new forms of non-emissive particle displays are disclosed using electrodes to rotate multicolored electrostatically and/or magnetically attracted microspheres. This results in a display that is colored, rather than limited to black and white display. Further, the invention allows the microspheres to be rotated rapidly, which can produce moving images or video. Accordingly, the invention would have an application in e-book readers, especially for purposes of adding colored illustrations and video features to devices. Another advantage of the invention over LCD screens and other traditional graphic display methods is that it only requires external energy when the display is changed. If, for example, the invention is utilized in a billboard, the display would not require a constant power source, but instead, would only need energy input when the display was changed. Likewise, when utilized in an e-book reader, the invention would increase battery life because the dynamically variable graphic material display does not continually require energy input.

One embodiment of the present invention is a dynamic display panel comprised of a transparent substrate containing an array of non-emissive pixel units, wherein the non-emissive pixel units are arranged within the transparent substrate to create a perforation pattern that is complementary to the pattern of non-emissive pixel units, wherein the perforation pattern is of sufficient area and distribution to allow substantially clear vision through the dynamic display panel when viewed from a side of relatively low illumination outward to an area of relatively high illumination.

The present invention is comprised of microspheres, electrodes, an energy source connected to the electrodes, and a substrate. The microspheres, which can be in a variety of shapes, have multicolored sectors with an embedded electrical and/or magnetic charge. Electrodes are connected to an energy source, which changes the polarity of the electrodes or creates a magnetic field, and the substrate. When the polarity of the electrodes is positive, the electrodes attract the negatively charged sectors of the microspheres. When the polarity of the electrodes is changed to negative, the electrodes attract the positively charged sectors of the microspheres. Additionally, when small electromagnetic circuits are powered either north or south these electromagnets attract or repel magnetic sectors of the microspheres. As a result of this process of attraction and repulsion, the microspheres rotate and the colors displayed to the user rotate. In one aspect of the invention, the substrate and electrodes are transparent and/or translucent so that a viewer can look thru the assembly when it is viewed from reverse.

BRIEF DESCRIPTION OF THE FIGURES

FIG. 5 is a facial view of an array of microspheres with sectors of different colors, each encased within a transparent shell.

FIG. 6 shows a facial view of an array of microspheres with an alternate layout of colored sectors.

FIG. 8 is a facial view of an assembled configuration of a series of microspheres showing fields of different colors.

FIG. 9 is a three-dimensional side view of one row of the assembled configuration shown in FIG. 8.

FIG. 10 is a facial view of an array of microspheres, wherein the cells of the microspheres are arranged in hexagonal cells.

FIG. 11 illustrates invention facial view of a partial array of microspheres, wherein the microspheres are encased in octagonal cells.

FIG. 12 is an exploded, flattened view of a six-sided cube with beveled corners wherein each face has a select color.

FIG. 13 shows one facial view of the beveled cube of FIG. 12 encased within a microsphere.

FIG. 14 shows an off-axis isometric view of the structure of FIG. 13.

FIG. 18A shows a configuration wherein all faces of a cube within a microsphere are colored. FIG. 18B shows a configuration of a cube with two transparent faces within a microsphere. FIG. 18C shows a similar configuration using a microsphere encased within a transparent spherical shell.

FIG. 25 shows side views of microspheres containing small particles with embedded positive and/or negative charges, wherein each microsphere is attached to an electrode that is expressing a positive, negative, or neutral charge that affects the distribution of the charged particles.

FIG. 26 shows a side view of another arrangement of microspheres as in FIG. 25, wherein the particles are spaced closely together to increase resolution.

FIGS. 27-28 show a side view of an arrangement of wherein the microcompartments are hemisphere-shaped. FIG. 27 shows the compartments are spaced closely together, while FIG. 28 depicts an embodiment where the compartments are spaced out.

DETAILED DESCRIPTION OF THE INVENTION

Figure 1:
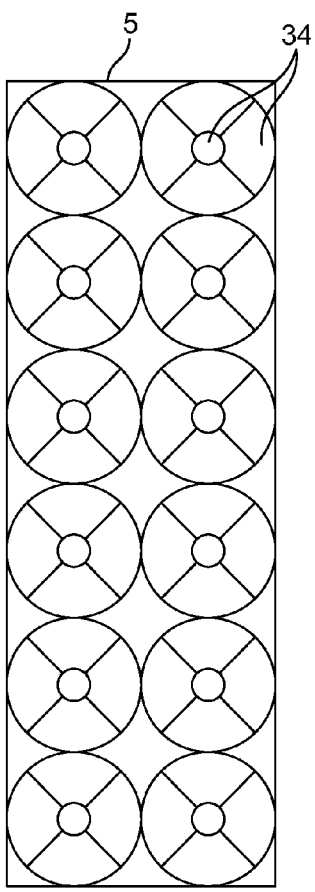
FIG. 1 illustrates a facial view of a series of microspheres, each with sectors of different colors.
Figure 2:
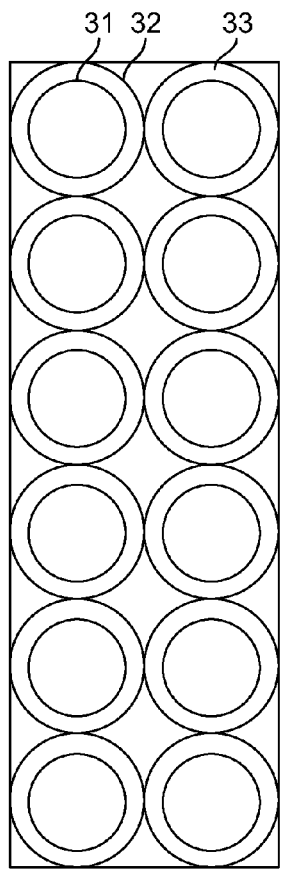
FIG. 2 shows a facial view of an array of microspheres wherein the microspheres are cased inside hollow, transparent shells.

FIGS. 1 and 2 illustrate microspheres in various embodiments of the invention. The microspheres consist of solid balls with different colored sectors (i.e., each of the primary colors) (34). Each sector has an embedded charge or magnetic properties: either positive, negative, north or south. The solid colored balls (31) may be inside hollow transparent shells (32). A space (33) exists between the solid colored balls (31) and the transparent shells (32) so that the solid colored balls can rotate freely inside the shells. This space may be filled with an intermediate medium such as a lubricating liquid or gas.

Figure 3:
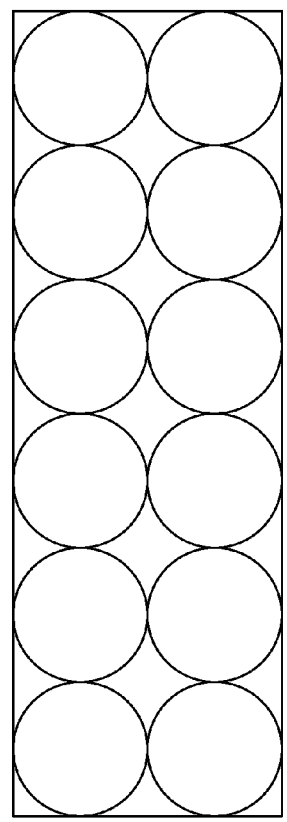
FIG. 3 is a facial view of an assembly of microspheres and electrodes on a substrate, placed into rows and columns.

Each of the microspheres is adhered in proximity to tiny electrodes to a substrate or base. The electrodes are bonded, printed onto or otherwise adhered to the substrate (5). FIG. 3 shows one possible placement of the assembly of electrodes and microspheres on a substrate. These assemblies may be placed in rows and columns, as shown in FIG. 3, or they may be placed in other patterns as desired.

In one embodiment of the invention, the microspheres rotate through an electrostatic method. In this method, a substrate is covered with a pattern of tiny electrodes. Next, the microspheres are charged with static electricity, and the electrodes are charged with an opposite charge. Since the opposite charges attract one another, the microspheres are attracted to the areas of the surface where the electrodes are. Either the microspheres or the substrate would have an adhesive means for bonding the two together. Alternatively, in another embodiment, adhesive is attracted to the electrodes when droplets of adhesive are charged with an opposite charge than that of the electrodes. The adhesive droplets are attracted to the areas of opposite charge and adhere there. The microspheres are then bonded to the areas of adhesive.

Figure 4:
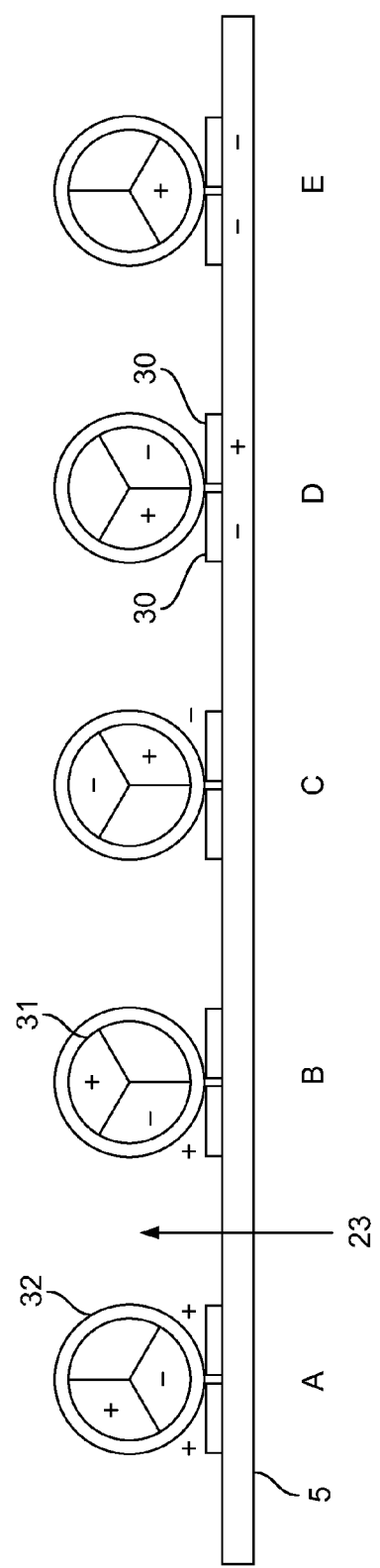
FIG. 4 is a cross-sectional view of exemplar microspheres encased in transparent shells and placed upon electrodes, which are bonded to a substrate.

FIG. 4 is a cross-sectional view of exemplar microspheres (31) encased in transparent shells (32) and placed upon electrodes (30), which are bonded to a substrate (5). FIG. 4A through 4E show how the electrodes rotate the microspheres to change the displayed color. In FIG. 4A, both the electrodes are positively charged which attract the negatively charged sector of the microsphere. FIG. 4B shows the electrode on the left positively charged and attracting the negatively charged sector of the microsphere. FIG. 4C shows the electrode on the right negatively charged and attracting the positively charged sector of the microsphere. FIG. 4D shows the electrode on the left negatively charged and attracting the positively charged sector of the microsphere while the electrode on the right is positively charged and attracting the negatively charged sector of the microsphere. FIG. 4E shows both electrodes negatively charged and attracting the positively charged sector of the microsphere. When a transparent substrate (5) is used as in FIG. 4, the assemblies of electrodes, microspheres, and transparent shells are spaced apart, and the electrodes have a dark color or appear to be light-absorbing when viewed through the transparent substrate (5), the assembly can have one-way graphic capabilities. The direction arrow (23) shows the see-through direction of this one-way graphic medium.

As the microspheres rotate in response to the electrodes' varying electrical charges, the different colored sectors become visible to the viewer. As there would typically be thousands or millions of tiny microspheres adhered to a given substrate, each microsphere would be a single pixel in an overall picture. Each pixel of color becomes part of the graphic image displayed. FIG. 5 illustrates a series of microspheres (31) with different sectors (34) having different colors and different inherent electrostatic charges that are encased in transparent shells (32). FIG. 6 illustrates another embodiment with another configuration of different colored sectors (34).

Figure 7:
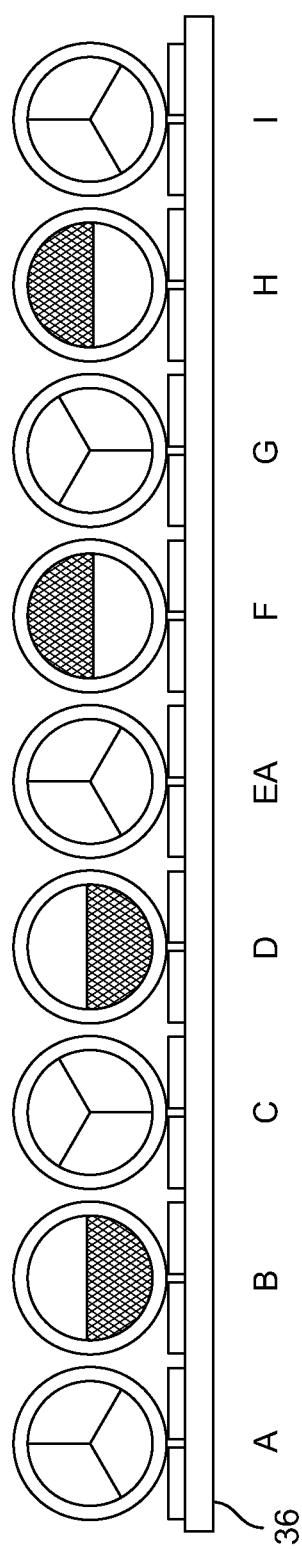
FIG. 7 shows a facial view of an array of alternating multicolored and black & white microspheres.

In one embodiment, shown in FIG. 7, the multicolored microspheres, represented in FIGS. 7A, 7C, 7E, 7G, and 7I, can be alternated in an assembly with microspheres that contain black and white sectors as represented in FIGS. 7B, 7D, 7F, and 7H. Such an assembly may have greater versatility in representing all colors, shades, and hues. Alternatively, each microsphere can contain sectors that are the three primary colors as well as black and white. Alternatively, it is possible, and may be desirable, to have microspheres with sectors that are colors other that the primary colors. It is also possible to have transparent microspheres with some sectors of the interior ball colored and some sectors left uncolored and transparent, so that when the microsphere is oriented correctly, one would be able to see through the assembly. This embodiment as a one-way graphic display is described below.

FIG. 8 illustrates one embodiment of the invention. The microspheres (31) are spherical and there are dividers (41) that form walls or boxes around the balls. These microspheres may, or may not, be encased in transparent shells as desired. FIG. 8 also shows how different orientations of the spherical balls may show different colors.

FIG. 9 shows a three-dimensional view of one row of the type of assembly of FIG. 8. The microspheres (31) are in boxes formed of dividers (41). Each of the four sides of the box around each microsphere, as well as the bottom of each box, may contain an electrode. These electrodes may be charged positively or negatively or the electrodes may energize tiny electromagnets to rotate the sphere in three dimensions in order to orient a particular side for viewing. The edges of the boxes may be crimped to contain the microsphere and to keep it from falling out of the assembly. Alternately, a transparent cover may be placed over the assembly to protect the assembly and also to prevent the microspheres from falling out of the boxes.

FIG. 10 shows an assembly of microspheres in six-sided boxes. Each of the sides or walls (41) may contain one or more electrodes to orient the microsphere as desired. Boxes of such shapes can be nestled more closely together than shown in FIG. 10, giving the pixels a substantially continuous appearance. In another embodiment, illustrated in FIG. 11, the microspheres are assembled in eight-sided boxes (41), which are arranged together and which would leave diamond-shaped gaps between the boxes. Such a configuration might be desirable for a one-way microsphere graphic display. The view through the assembly would be from the opposite side through the diamond shaped holes or voids.

Microspheres can be made by various methods. In one such method, the microspheres are produced by building layer upon layer of different materials. The interior ball is first produced and can be painted by a number of different methods, such as powder coating, stamp painting, roller painting, spray-painting, or other similar methods. If the paint, ink, or colored material has an embedded electrostatic charge or magnetic properties, the balls can be rotated into position by electrostatic and/or magnetic forces for preparation for the application of the next colored material. The balls can be rotated and aligned for each additional color as desired. Thousands or millions of balls can be quickly coated with multiple colors this way.

Once the interior ball is colored, it can be coated with a material that changes phases from a liquid to a solid and then back from a solid to a liquid. This coating would produce an intermediate medium. The coating process can use either a liquid or a powder that uniformly adheres to and coats the interior colored ball. Once the colored ball has been uniformly coated, a similar coating process can produce the exterior shell. After the exterior shell is produced and has cured, the intermediate medium is made to change phase to a liquid. This allows the microsphere to rotate freely within the exterior shell lubricated by the liquid intermediate medium.

Another method of creating the microsphere consisting of a colored ball surrounded by a liquid lubricating layer within a transparent shell is as follows. First, any number of means or methods is used to create a colored ball. Next, the colored ball is placed into a two-part mold in the shape of a tiny sphere, oval, egg, oblong or other desired shape surrounded by an intermediate medium liquid. The filled mold is cooled until the intermediate medium turns solid or reasonably solid. The mold is opened and the colored ball encased in a solidified liquid in the shape of the mold is removed. This object is then either coated with the transparent shell material, placed into sections of shell material that are bonded around the colored ball encased in the solidified intermediate medium liquid, or placed into another mold where the shell material is molded around it.

Many other methods of producing such microspheres may be created or otherwise developed.

The colored balls of the microspheres need not be spherical—oblongs, ovals, egg shapes, cylinders, rounded cubes, and other such shapes may be used.

FIG. 12 shows a preferred embodiment utilizing microspheres shaped in a six-sided cube with rounded corners that is laid out flat. In this embodiment, each of the six sides is a different color (34). Some sides may be charged or have a magnetic dipole associated with them; others may have no charge at all. FIGS. 13 and 14 show an embodiment with a six-sided cube with rounded corners and the microspheres encased in a transparent spherical shell. The multicolored microsphere cube is free to rotate inside the transparent spherical shell as the electrodes (30) attract or repel different sides of the cubes. FIG. 14 is an isometric view of the embodiment depicted in FIG. 13.

Figure 15:
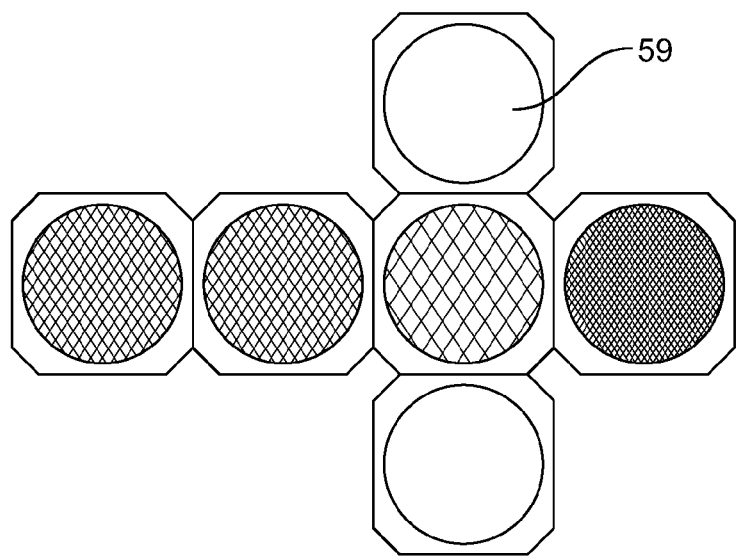
FIG. 15 is an exploded, flattened view of a six-sided cube as in FIG. 12, wherein two faces are left transparent.
Figure 16:
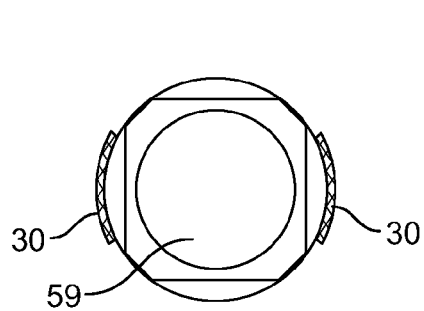
FIG. 16 is a facial view of the cube similar to FIG. 13, with fewer electrodes.
Figure 17:
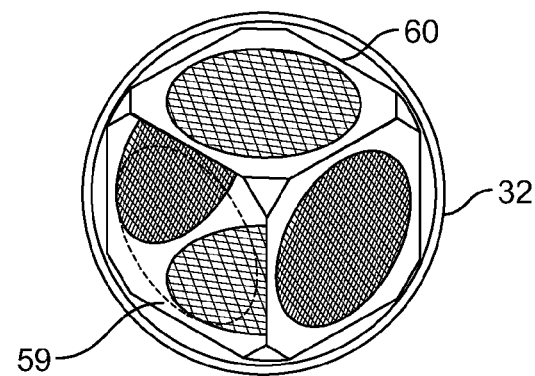
FIG. 17 is an isometric view of the cube.
Figure 18:
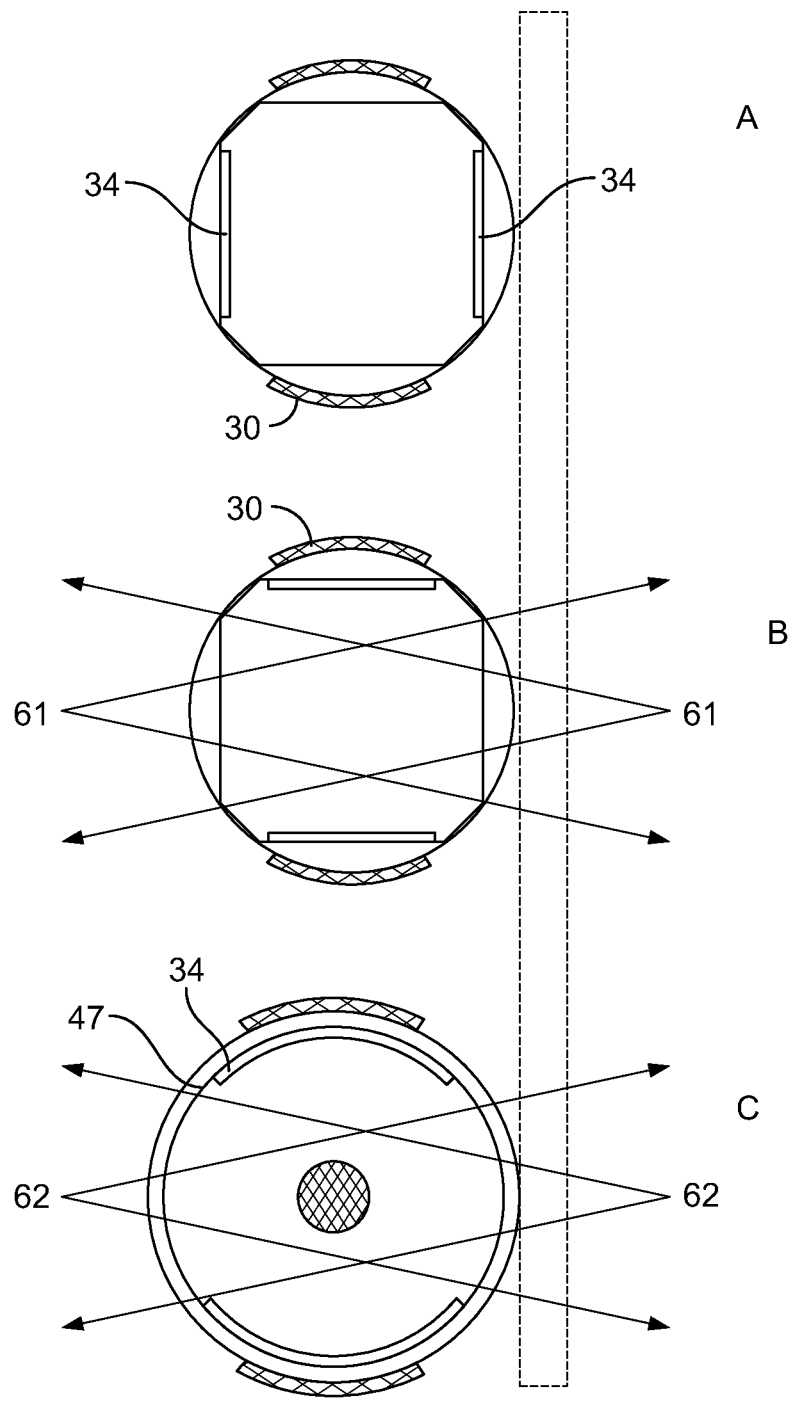
FIG. 18 is a cut away side view of three possible configurations of microcubes and/or microspheres.

FIG. 15 is an illustration of a six-sided transparent cube with rounded corners that is laid out flat. FIG. 15 shows two sides that are left transparent (59), while the other sides have different colors with positive and negative charges. FIG. 16 shows the six-sided cube with rounded corners as in FIG. 13 with fewer electrodes. FIG. 17 shows an isometric view of this embodiment. FIG. 18A shows a cut away view of the assembly of transparent six-sided cube with rounded corners and colored sides (34) inside a transparent shell with electrodes (30). The assembly is bonded to a transparent or translucent substrate. FIG. 18B shows that the viewer can see through the assembly (61) when the microsphere is oriented correctly. FIG. 18C shows that a spherical microsphere or a microcylinder can achieve similar effects.

Additionally, in a preferred embodiment of the invention, tiny cylindrical objects encased inside of small tubes comprise the microspheres. These tiny cylindrical objects could have segments that are different colors and have different embedded electrostatic and/or magnetic charges. These may be produced through the extrusion method where each segment consists of a different material or a material that differs solely in color or embedded electrostatic and/or magnetic charge. The diameter of the cylindrical objects can be reduced to a very small state through such methods as rolling, squeezing, stretching, or other such well-known processes. Once the diameter of the cylinder is reduced to the desired thickness, it can be cut, sliced, or otherwise divided into short cylindrical pieces. These short cylindrical pieces can then be encased in a transparent tube that holds the short cylindrical pieces in place and protects them. The backside of the transparent tube would have a pattern of electrodes in order to properly orient the short cylindrical pieces. These tubes can be placed closely together to create a solid graphic material, or the tubes can be spaced apart to create a one-way graphic material. By adhering the tubes to a mesh, window, transparent substrate, or other such support structure that allows the passage of light, a one-way graphic material can be made.

Figure 19:
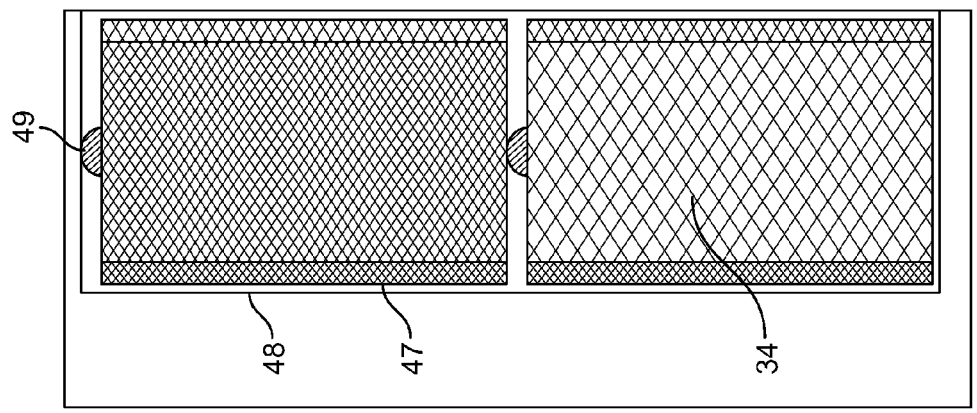
FIG. 19 shows a side-view of microcylinder-based array encased in a tube.

FIG. 19 shows an embodiment of the invention utilizing microcylinders (47). These microcylinders are encased in a tube (48), which is transparent or translucent. Spacers (49) may be provided to separate the microcylinders and to facilitate their rotation independently. Different sides of the microcylinders may have different colors with different embedded charges (34). Electrodes may be placed on the walls of the cylinder or on the underlying substrate in order to attract or repel different sectors of the microcylinders in order that they rotate to orient a particular color as desired.

Figure 21:
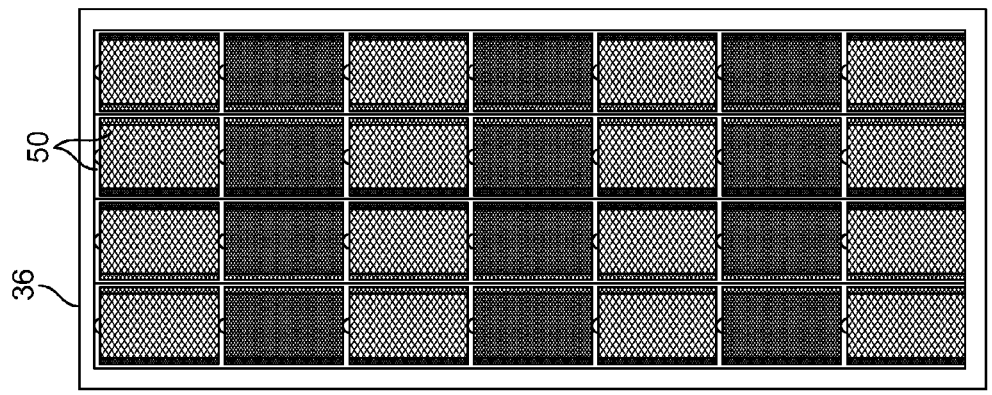
FIG. 21 shows a higher resolution arrangement of the apparatus of FIG. 18, in which the spacing between tubes is minimized.
Figure 20:
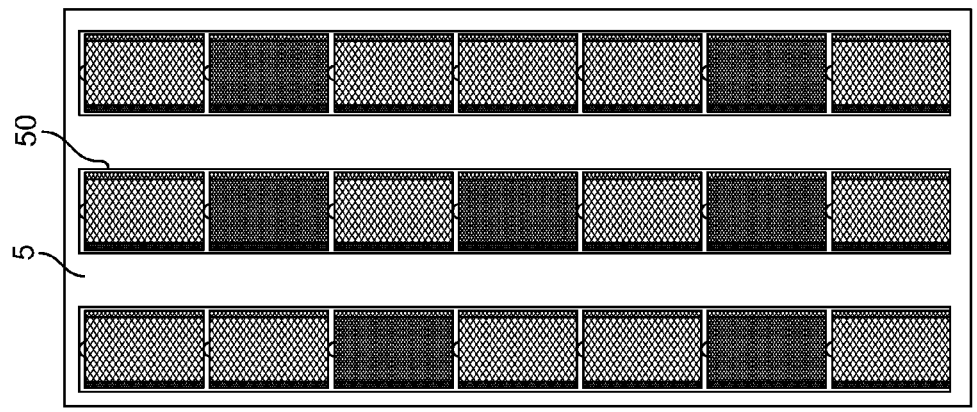
FIG. 20 shows a face-on view of an array of axially-attached microcylinders arranged in microtubes with spacers or voids between tubes.

FIG. 20 shows tubes with many microcylinders (50) bonded to a transparent substrate (5). The tubes with microcylinders (50) have spaces or voids between them in order to create a one-way graphic material. FIG. 21 shows microcylinders (50) bonded closely together on a substrate (36) in order to create a graphic material with a high-resolution. The smaller the cylinders are and the closer they are mounted together on the substrate, the higher the resolution or quality of the graphic image.

Figure 22:
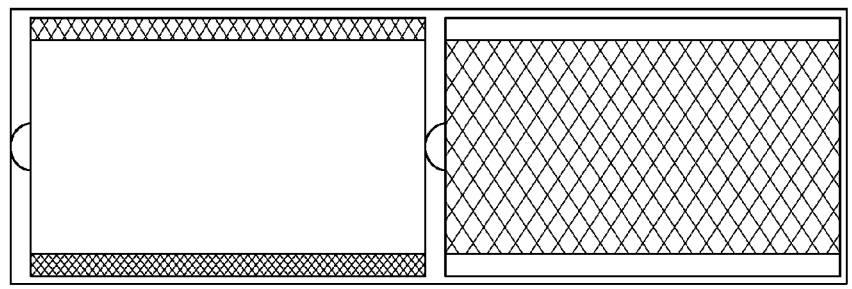
FIG. 22 shows a side-view of microcylinder-based array as in FIG. 17, wherein the microcylinders have black and white opposite faces with a transparent surface area between them.

FIG. 22 shows transparent microcylinders with coatings of black and white on opposite sides. The top microcylinder is oriented so that the viewer can see through it to the pattern on the other side of the microcylinder. The bottom microcylinder is oriented so that the viewer sees the black side, so it appears substantially black. The tube that contains the two microcylinders is bonded to a transparent substrate.

Figure 24:
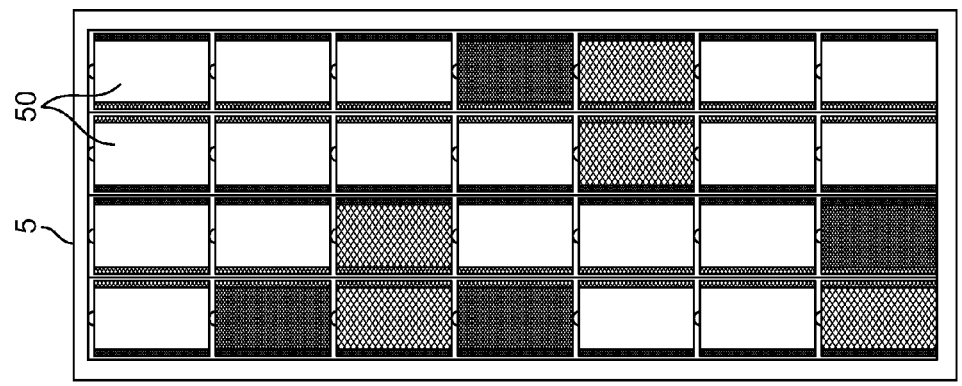
FIG. 24 shows a higher resolution arrangement of the apparatus of FIG. 21, in which the spacing between tubes is minimized.
Figure 23:
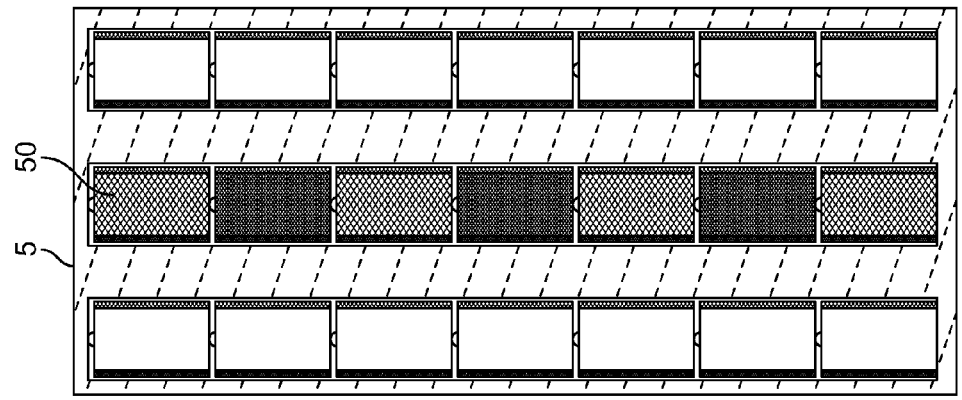
FIG. 23 shows a face-on view of an array of axially-attached microcylinders as in FIG. 20, wherein the microcylinders have faces of different colors, arranged with spacers as per FIG. 18.

FIGS. 23 and 24 show different possible orientations of transparent microcylinders with two opposite sides coated with color (50) that are bonded to a transparent or translucent substrate (5). The assemblies of this configuration can be used to vary the amount of a light transmitted through the assembly, absorb solar heat and/or reflect solar heat as desired. Although not shown, the microcylinders may have flat planes along their surfaces.

In another embodiment of the invention, the graphic display is created using microspheres shaped like bubbles, pouches, or pillows. Such bubbles, pouches, or pillows could be filled with particles of a certain color with an embedded positive charge, particles of a different color with a negative embedded charge, and a liquid of a third color. These particles are attracted or repelled in a manner similar to the sectors of the colored interior balls inside of the microspheres by a pattern of electrodes that are charged or neutral as desired. These bubbles, pouches, or pillows can be created by sealing a material to the substrate such that bubbles, pouches, or pillows filled with the desired liquids and/or compounds are created.

FIG. 25 shows an embodiment of the invention where the microspheres consist of a transparent shell (32) containing small particles with embedded charges in different colors attached to a substrate (5). In FIG. 25A, the red particles (52) with an embedded negative charge are attracted to the positively charged electrode (30). Blue particles (51) are positively charged and are repelled from the positively charged electrode (30). The particles are suspended in a tinted liquid (53) and contained by a transparent shell (32). FIG. 25B shows what happens when the electrode is negatively charged. The blue positively charged particles are attracted to the electrode wall and the red negatively charged particles are repelled away from the electrode wall. FIG. 25C shows what happens when there is no charge, or a neutral charge on the electrode. Here, the particles settle to the bottom of the tinted liquid. When a viewer is standing on the right side of the display and looks at the display, he sees a blue colored microsphere at FIG. 25A, a red colored microsphere at FIG. 25B, and a yellow colored microsphere at FIG. 25C. When a viewer looks at the display from a distance, he tends not to focus on the electrodes, but rather, he looks through the assembly to where there is recognizable color and pattern. When a viewer is standing on the left side of the display, looking closely at the display, he can see a pattern of dark microspheres through a transparent sheet.

FIG. 26 shows a similar configuration of microspheres consisting of transparent shells (32) containing tinted liquid (53) and colored charged particles (51) (52) (54) resting on an electrode and bonded to a substrate. In this embodiment, the spacing between those elements is minimized to provide a more solid looking graphic material and to create a higher resolution image.

FIG. 27 shows another embodiment of the invention consisting of a transparent pouch (55) containing tiny microspheres (42) that have two sides, each with a different color and each with a different embedded charge. In FIG. 27A, with the electrode (30) positively charged, the electrode attracts the negatively charged white side while repelling the positively charged black side of each tiny microsphere. Liquid or air may also be encased in the pouch in the areas around the tiny microspheres. FIG. 27B shows the same configuration but with a negatively charged electrode. Here, the negatively charged electrode repels the negatively charged white side of the tiny microspheres, while attracting the positively charged black side of the microspheres. FIG. 27C shows a configuration similar to FIG. 27B, with small, colored particles with embedded charges being repelled or attracted to the electrode. Here, the negatively charged electrode attracts the positively charged blue particles and repels the negatively charged red particles. FIG. 27D shows a positively charged electrode attracting the negatively charged red particles and repelling the positively charged blue particles. FIG. 27E shows the particles settling to the bottom of the pouch when there is no charge on the electrode. In FIG. 27, the pouches are spaced closely together to give the appearance of a solid graphic.

In another embodiment of the invention, illustrated by FIG. 28, the pouches are placed apart from each other to produce transparent areas through which one can see. This configuration creates a one-way changeable graphic medium. FIG. 28A shows a pouch similar to that of FIG. 27A in which a positively charged electrode attracts the negatively charged white sides of tiny microspheres while repelling the positively charged black side of each of the tiny microspheres. The vision through the assembly is achieved in the areas between the pouches (56).

When the invention is practiced utilizing pouches, the pouches can be made in many different shapes sizes and configurations, for example, circular, linear as a section of tube, rectangular, or other polygons, or they can be made in random shapes, as desired. During the forming process, the material between the pouches can be pressed and bonded to other elements in the assembly. For example, a press may both mold and bond the transparent material to either the electrodes or to the underlying substrate. The pouches in the transparent material can be pre-formed before the bonding process or the pouches can be formed as part of the bonding process, as desired.

Figure 29:
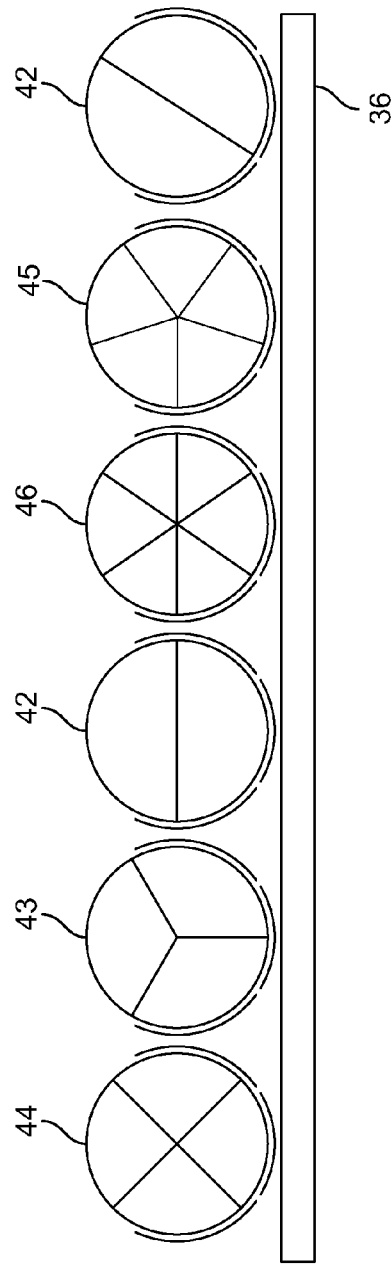
FIG. 29 illustrates cross-sectional views of various microspheres containing different numbers of colors on each microsphere.

Many different orientations of the colored sectors of the microspheres are possible. As shown in FIG. 29, the microspheres can be constructed with various numbers of sides or sectors, including but not limited to, two sides or sectors (bicolored) (42), three sides or sectors (tricolored) (43), four sides or sectors (44), five sides or sectors (45), or six sides or sectors (46). In FIG. 29, the microsphere assemblies are spaced closely together, but they need not be.

All microspheres described in this specification can be made in different sizes ranging from several inches across for large billboards to a microscopic size for fine detail.

The electrodes can be constructed by such methods as printing of conductive inks or other conductive materials, plating or etching processes, vapor deposition, adhesion of conductive films, or other such processes. The polarity of the electrodes can be changed by an energy source transmitting electrical charge to the electrodes through any of the following means: e.g., wires, printed conductive lines or areas that are transparent, induction, laser, electron gun, electronic discharge, capacitor, electrolytes, electrophosphorus, and/or particle gun.

Figure 30:
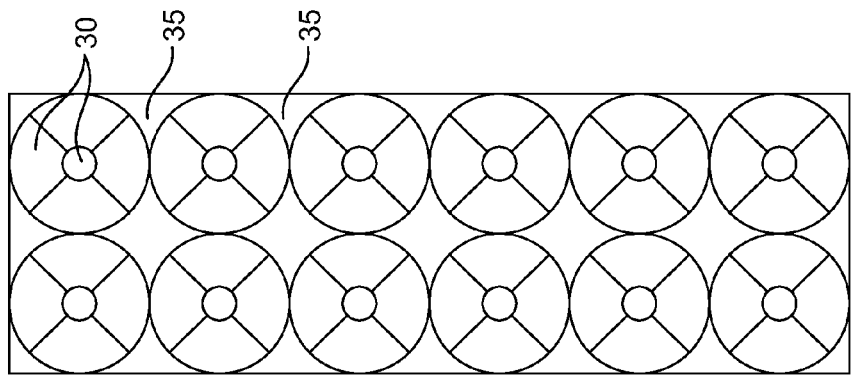
FIG. 30 one embodiment of the invention with conductive elements (35) in a mesh or grid form that can be used to transmit electrical charges to the different electrodes (30).
Figure 31:
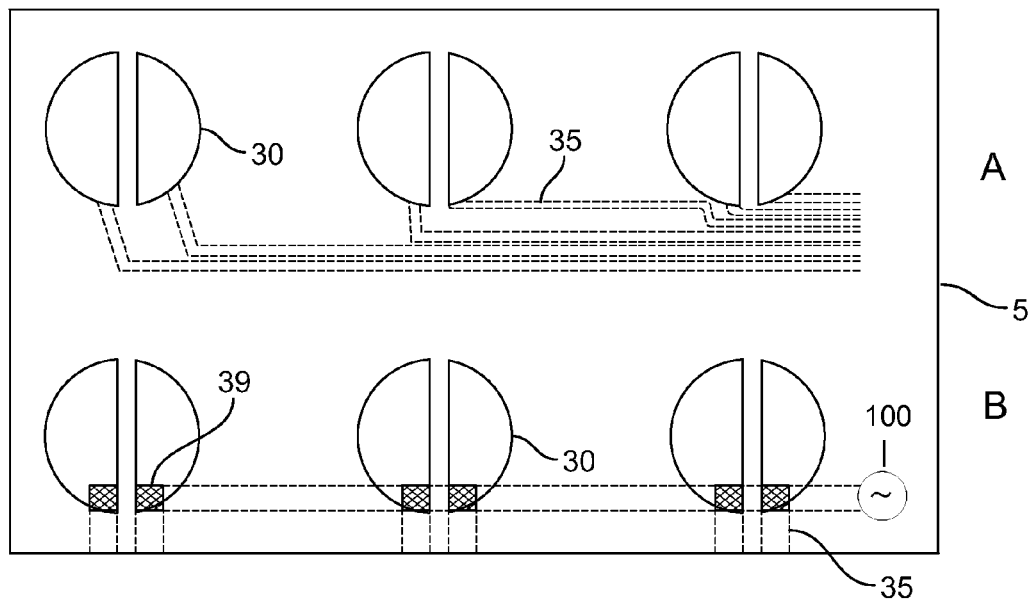
FIGS. 31 and 32 illustrate alternate configurations of conductive elements that transport electrical charges to the electrodes that control the microspheres and other embodiments of the present invention.

FIG. 30 shows a diagram in one embodiment of the invention with microspheres with different colored sectors (34) embedded in a mesh or grid in a substrate (36) that can be used to transmit electrical charges to the different electrodes attached to the colored microspheres. FIG. 31A shows one possible configuration for the conductive elements (35) that transport electrical charges to the electrodes (30) controlling each microsphere. Here, each conductive element is connected individually to the electrodes. The conductive elements (35) may be of a transparent or translucent conductive material. FIG. 31B shows another possible configuration in which the electrodes (30) are connected to micro switches (39), which open and close a circuit in order that the charge to the electrode may be changed as desired. Such switches (39) may be solid-state, transistor elements, nano switches, gates or other such elements. They may be constructed so that when power comes across the horizontal conductor the switches are open along that line (5); power from the vertical conductors can then change the charge on the electrodes (30). FIG. 31B shows an energy source (100) connected to the array and, subsequently, the electrodes. Many other such configurations are possible.

Figure 32:
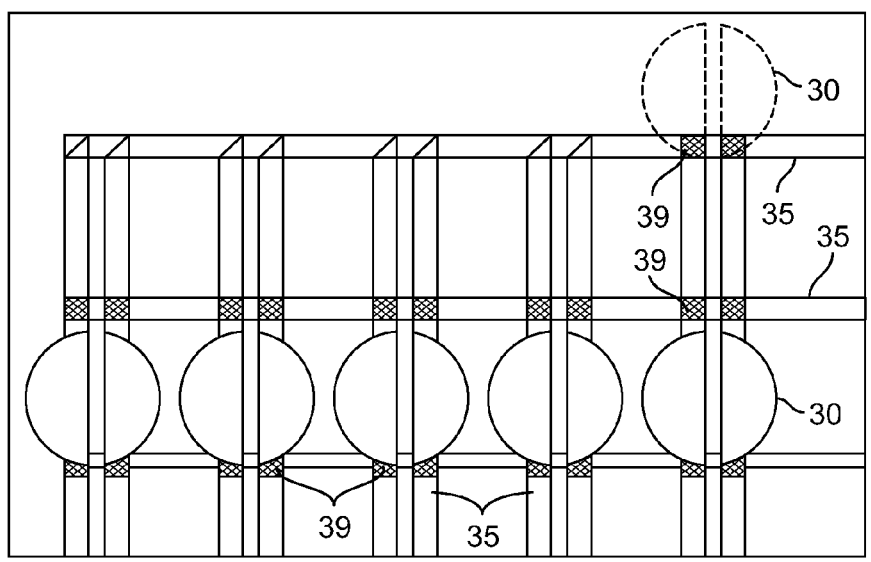

For example, FIG. 32 illustrates another embodiment of the invention utilizing micro switches. FIG. 32 shows electrical conductors (35) connecting to micro switches (39) and the placement of electrodes (30) on the micro switches. The number of conductors connected to the electrodes may be more or fewer as desired, and more electrodes may be used if desired.

Figure 33:
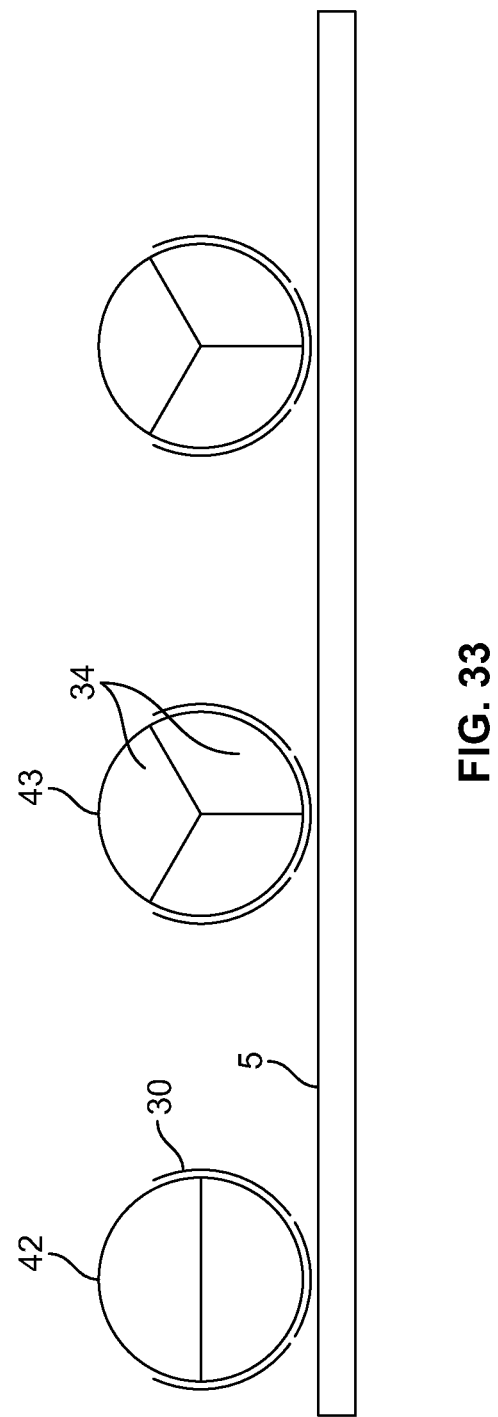
FIG. 33 schematically illustrates various placements of three-dimensional electrodes wrapped around various microspheres in various embodiments of the present invention.

In one embodiment of the invention, as illustrated in FIG. 33, the electrodes (30) utilized are three-dimensional that may wrap around the microspheres, which may be bicolored (42) and tri-colored (43). These three-dimensional electrodes allow greater possibilities for orienting the microspheres sectors (34) in three dimensions. The three-dimensional electrodes may be constructed so that they hold the microspheres loosely enough that the microspheres can freely rotate, yet will not fall out. This assembly of electrode and microsphere can bonded to transparent substrate (5) as in FIG. 33 in order to achieve one-way graphic properties. Three-dimensional electrodes may be applied to the configurations that include transparent shells or tubes to contain the microspheres.

The electrodes can be controlled by user-directed energy. Such energy can come from a laser, electron gun, electronic discharge, particle gun or the like. The electrodes can have elements that absorb such energy and convert it into electrical charges. One such method would have photovoltaic elements bonded to, or deposited on, the electrodes. When a laser light strikes such photovoltaic elements they produce either a positive or a negative charge depending on their configuration. These photovoltaic elements could be made so that they were unaffected by ambient light levels or by direct sunlight, and only the desired laser wavelength and energy level. This configuration would allow the rapid change of the image through the use of a scanning laser beam.

Figure 34:
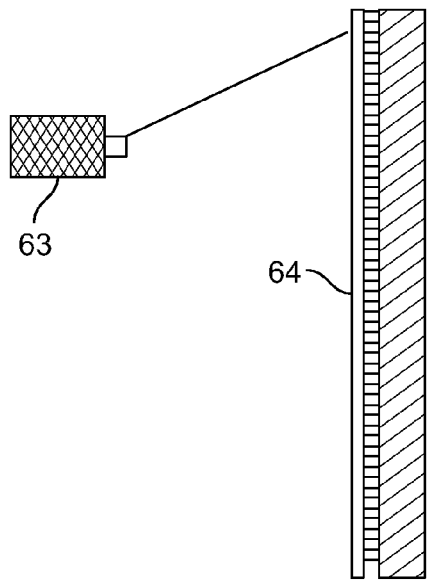
FIGS. 34-37 schematically illustrate various configurations of an energy source directed to the electrodes or elements connected to the electrodes in various embodiments of the present invention. The figures show the energy source attaching through a substrate (FIG. 34), through the substrate and a window (FIG. 35), and through an adhesive layer on an interior mounted one-way graphic display (FIG. 36) and exterior mounted one-way graphic display (FIG. 37).
Figure 35:
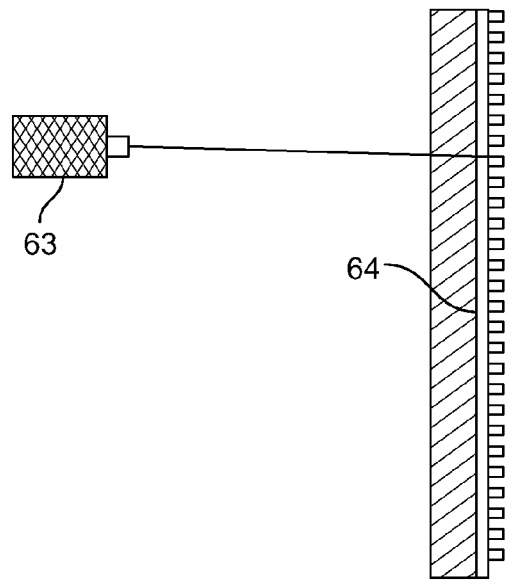
Figure 36:
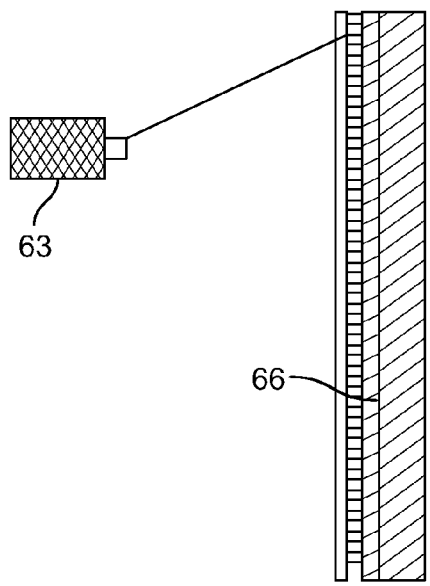
Figure 37:
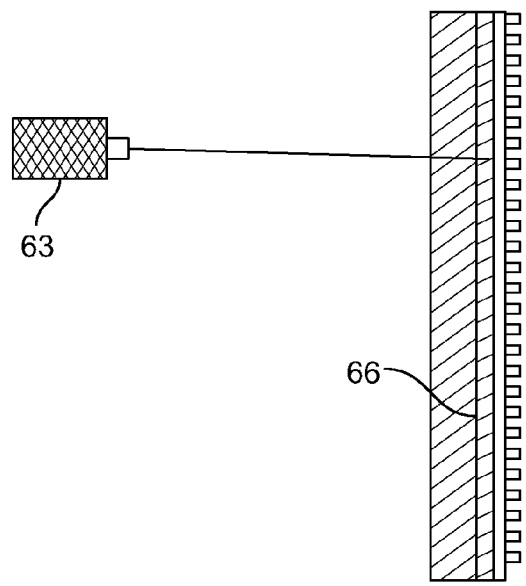

FIGS. 34 through 37 illustrate some of the possible configurations of the energy source directed to the electrodes or to elements connecting to the electrodes for the purpose of changing the polarity of the electrodes to change the graphic image. FIG. 34 shows the energy source (63) going through a substrate (64) to the electrodes or the elements connecting to the electrodes on an interior mount photovoltaic microsphere one-way graphic display. FIG. 35 shows the energy source (63) going through both the window and the substrate (64) to the electrodes and the elements connecting to the electrodes on an exterior mount photovoltaic microsphere one-way graphic display. FIG. 36 shows the configuration of FIG. 34 with the addition of an adhesive layer (66) on an interior mount photovoltaic microsphere one-way graphic display. FIG. 37 shows the configuration of FIG. 35 with the addition of an adhesive layer (66) on an exterior mount photovoltaic microsphere one-way graphic display.

Alternatively, the electrodes can be controlled temporarily through the use of a removable control module. In this instance, the image is programmed onto the surface where the image remains after the removal of the control module. With this, the graphic image can be quickly changed to adapt to the need to update the graphics. This feature is especially important for advertisements that must be updated or changed to remain current. Often it is desirable to promote specials or sales and a graphic that can be quickly changed without removal and reinstallation has great benefits. The control is "plugged" into the graphic assembly to change the graphic and then the control module is removed.

Another method of changing the graphic involves the application of a plate or screen with charged areas, over the microsphere assembly. The areas of the plate or screen charge the electrodes through induction and the image remains after the plate or screen is removed. Alternately, a charging device may be moved across the surface of the microsphere assembly to change the charges of the electrodes, or to change the orientation of the solid colored balls inside the microspheres. Such a device can use such means as printed conductive lines or areas, wires, printed conductive lines or areas that are transparent, electrostatic induction, laser, electron gun, electronic discharge, capacitor, electret, electrophosphorus, particle gun, or the like.

The invention may utilize many different substrates and may be created in many different sizes. For example, desirable substrates include thin paper-like material, opaque plastic material, glass, Lexan, Plexiglas, mesh, fabric, or other transparent or semi-transparent or opaque material. Any dielectric material capable of supporting microspheres can be used as the substrate. Conductive materials such as metals or conductive plastics can be used if coated with a dielectric coating. Color changing microspheres bonded to a fabric or mesh can be used to create color changeable fabrics, materials, clothing, draperies, screens, curtains, fashion accessories, or the like. Such material may also be used for creating products with one-way properties. Additionally, the products may incorporate light transmitting fibers for illumination effects and, like the other products described herein, may be formed, constructed, made, or otherwise made to conform to a three dimensional shape.

Figure 38:
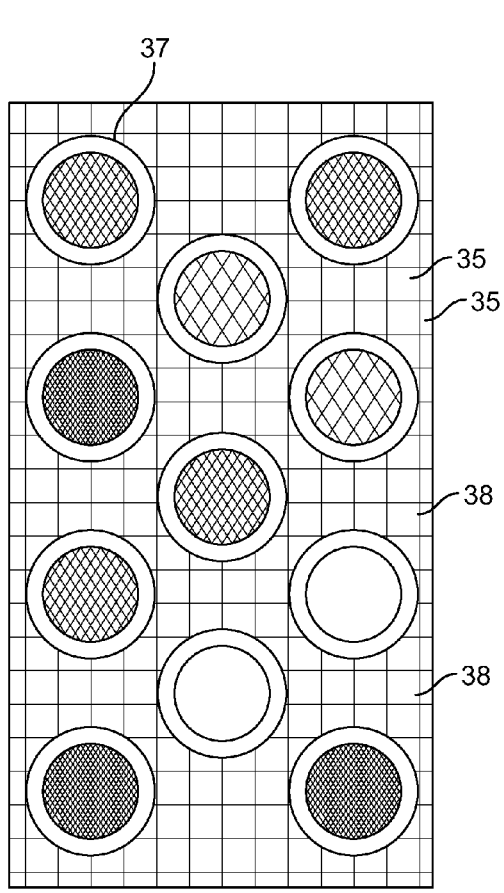
FIGS. 38 and 39 schematically illustrate various placements of microspheres on a mesh material in various embodiments of the present invention.

FIG. 38 shows an embodiment of the invention with the placement of microspheres on a mesh (38) material substrate. Conductive elements (35) are woven into the mesh. These conductive elements (35) may be coated with a dielectric material or an insulative material if desired. Not shown are the electrodes and micro switches that would be placed between the mesh and the microspheres. With a loosely woven mesh and spaced apart electrodes and microspheres, when the assembly is viewed from the reverse, the electrodes would block the view of the microspheres. When the electrodes appear to be of a dark color or have a light-absorbing compound on the surface that would be visible from the reverse side of the assembly, the assembly would have the properties of a one-way graphic material. In this configuration one looking from the reverse would look through the holes in the mesh, while one looking at the face of the graphic assembly would see the microspheres in different colors forming the pixels of an image. With a closely-knit or woven fabric or mesh and with close spacing between the microspheres and electrodes, a color change fabric is created.

Figure 39:
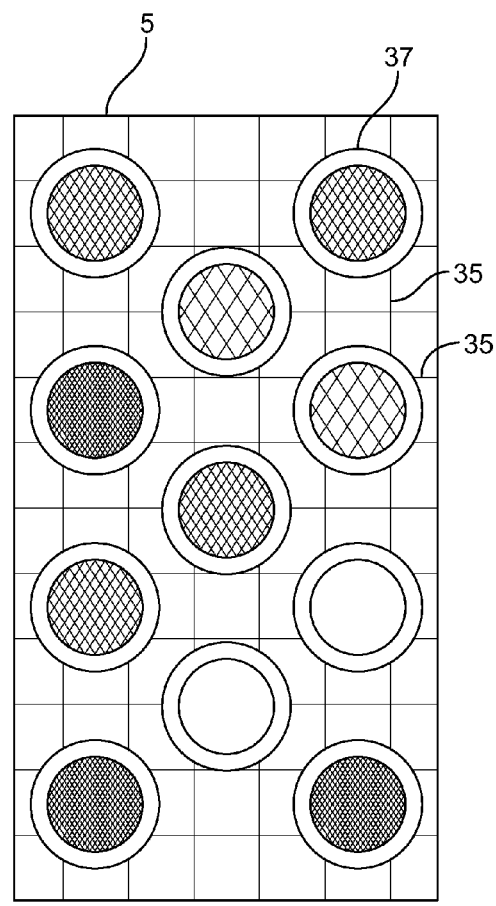

FIG. 39 shows the microspheres (37) bonded to a transparent substrate (5) with very fine or transparent conductive elements (35) providing energy to micro switches and electrodes which would be placed between the microspheres and the transparent substrate. The assembly of FIG. 39 may have one-way graphic properties when both the substrate and the conductive elements are transparent or nearly so. The conductive elements (35) may be so thin as to appear invisible when viewed from a distance. As with FIG. 38, the electrodes in FIG. 39 would appear to be a dark color or have a light-absorbing compound on the surface that would be visible from the reverse side of the assembly.

Use in One-Way Graphics

In another embodiment of the invention, the microspheres consist of transparent material to create a one-way graphic display. The one-way graphic display would consist of a transparent substrate with either transparent electrodes covering it or covered by light-absorbing areas or light-absorbing electrodes. The microspheres would then be adhered to those areas that contain the transparent electrodes with the light-absorbing areas or the light-absorbing electrodes. The areas of the transparent material around the stacked assembly of microspheres, light-absorbing areas, and electrodes are left transparent, creating a pattern of visual perforation. When a viewer looks closely at one side of the assembly, the viewer sees a transparent material covered with the pattern of tiny black areas. Standing at a distance, a viewer typically would not see the black areas but would look through the pattern of perforation created by the transparent material to where there is color and pattern. The assembly from this view would be a semi-transparent screen that tends to dim or tint the view. From this view, the microspheres are behind the light-absorbing areas or the light-absorbing electrodes and are not generally visible. This would be considered the "see-through" side of the one-way graphic material with microspheres.

On the other side of the assembly, one sees the multicolored microspheres on the surface of the transparent material. The colored microspheres, through the attraction and repulsion of charges on the electrodes, can be rotated so that a particular colored side is presented. Dozens, hundreds, thousands, or millions of these colored microspheres are made to represent pictures or other graphic images. Since the multicolored microspheres create color and pattern on the surface of the transparent material and the image is perceived on the surface of the transparent material, objects, images, or views beyond the surface of the transparent material are generally not perceived. With continuous control of the electrodes a constantly moving and changing image can be presented, such as a movie, TV image, slide show, video presentation, animation, or other such moving, changing, graphic image or images. Since the colored sides of the microspheres are visible with or without power or energy being connected to the display, the graphic can be disconnected from power and still be readable. Power is needed only when the graphic or portions of the graphic are to be changed. For devices that require batteries to power a graphic screen, the use of such a microsphere graphic screen can result in much longer battery life.

As used herein, "one-way graphic materials" refers to materials that appear essentially opaque and non-transparent from the image side, but appear substantially transparent when viewed from the non-image side under appropriate light conditions. The direction of one-way vision may change with environmental conditions, such as when night falls and lights are turned on inside a building. Images are typically placed on the light side of the one-way material. People viewing from that side will see the image. People viewing the material from the back side of the material do not see the image, but instead see the environment on the far side of the one-way graphic. Generally, one-way graphic materials are constructed using films or sheets that have multiple gaps or perforations in their non-transparent surface, thereby allowing light to permeate through the material.

"Non-printable area" or "non-bonding area" refers generally to any area of print medium which does not bond permanently to ink used during printing, such that any ink on that area may be physically removed during the printing process, leaving behind a gap, absence, or perforation in the target image. The non-printable or non-bonding area may be continuous or discontinuous, and may be of varying sizes or patterns, including holes, dots, grids, matrices, lattices, or random patterns.

"Perforation" or "void" refers generally to any void or area of complete transparency in a panel of one-way graphic material. A perforation may be physical, as in the case of a hole cut through or from a material, or visual, as in the case where a physically non-perforated substrate contains areas of transparency. Perforations may be of varying sizes or patterns, including holes, dots, grids, matrices, lattices, or random patterns.

"Perforation pattern" refers to the collective area of perforations and/or voids in a one-way graphic panel. The perforation pattern generally constitutes 25% to 75% of the surface area of a panel, and is usually around 50% of the area. For example, in commercially available perforated PVC films for one-way graphics such as SuperVue™, ImageVue™, and ImageJetVue™ films distributed by Clear Focus Imaging, Inc., and Avery® HP MPI 2728 perforated 65/35 film, the perforated area generally constitutes 50% or 35% of the total surface area of the film.

Persons of skill in the art will recognize that the one-way graphic material applications described herein are not limited to the microsphere arrays and other embodiments described above. The non-emissive technologies which could be used within this invention include previously known non-emissive display technologies such as those described in U.S. Pat. No. 5,930,026 (commonly known as E Ink®), which may be adapted to use in the apparatus and method of the invention by constructing sufficiently small non-emissive display units and embedding them with the transparent substrate in a pattern and distribution sufficient to create a "see-through" perforation pattern. In yet other embodiments of the invention, the non-emissive display units could be sized and spaced within a physically perforated structure to create the same effect.

Another method of producing one-way graphic material using microspheres is to apply the microspheres onto a perforated surface. The perforated surface would be of a light-absorbing material or a dark color on the backside, or the opposite side from the microspheres. The ratio of holes, or open area, to that of the solid material would be in the range of 25% to 75%. In a preferred embodiment of the invention, the ratio of open area would be around 50%. A woven material or screen can be used in place of the perforated material; such screen can incorporate conductive elements in the woven mesh. The woven mesh could be pressed flat, which would aid in the application of an adhesive layer and in the installation of the material to another surface. Pressing the material flat would eliminate the variation of thickness of the warp and weave of the woven material. The pressing could be done any number of ways including using combinations of heat and pressure. This could include passing the material through heated rollers that would flatten and bond the individual filaments.

The one-way graphic material with microspheres can be combined with graphic material with microspheres (without the one-way properties) for many different applications. For applications with areas of both transparent and opaque areas, the one-way material can be used on the transparent areas while the graphic material without the one-way properties can be used on the opaque areas. Such an application could be a storefront, where the exterior of the store building consists of solid wall areas and areas of glass. Another possible application is that of a transit bus, school bus, city bus, or the like, which consists of window areas and solid, opaque areas. Other applications include, but are not limited to, changeable camouflage for buildings, vehicles, changeable wallpaper that can be a TV wall or an interactive visual media for stress reduction. Since the material can be made thin, it can be wrapped around three-dimensional objects, or it could be molded into different shapes as desired. Alternately, the microspheres can be adhered to three-dimensional objects. For example, buildings can be wrapped with this material and can change their appearance as often as a TV screen changes.

Figure 40:
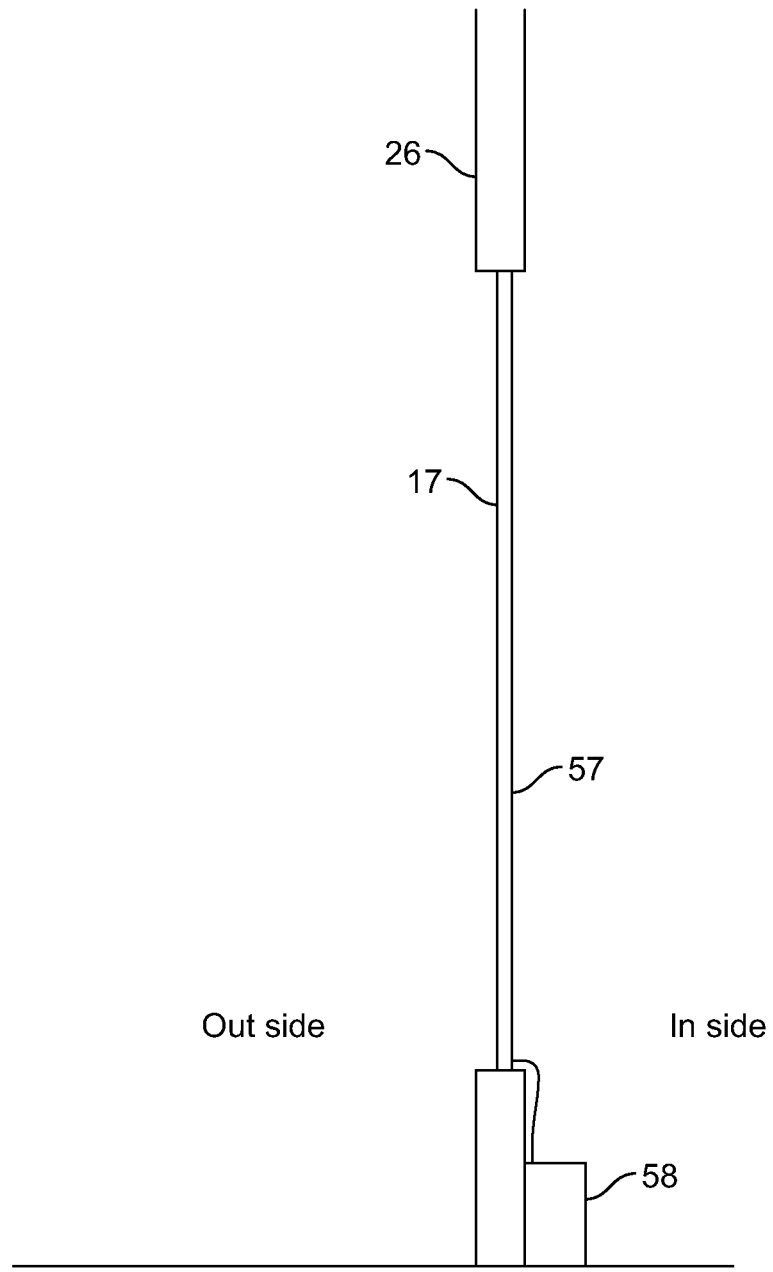
FIG. 40 schematically illustrates a cross-sectional view of a storefront application of the present invention.

FIG. 40 shows a cross-section of a storefront application. In this embodiment, the storefront includes a section of wall (26) and a section of a window (17). A one-way microsphere graphic display (57), as described herein, is placed on the storefront. This embodiment includes a control module (58) for the one-way microsphere graphic display. This control unit may be attached to the assembly for brief periods to periodically change the graphic display or it may remain attached for longer periods to continuously control and change the graphics.

Any of the embodiments can additionally include a protective coating or layer. This layer would be applied to the face of the graphic material over the microspheres. This layer can include such layers and coatings as a laminated plastic film, a lenticular lens assembly, a sprayed or painted on coating, an epoxy-type coating, a coating or layer with ultraviolet shielding properties, a layer or coating with resistance to cleaning compounds and other chemicals, a layer or coating to protect against scratching and shocks, a coating to protect against electromagnetic or electrostatic interference, and a liquid resistant layer or coating. The protective layer or coating can be perforated or not as desired.

The invention claimed is:

1. A dynamically variable one-way graphic display comprising an arrangement of:
a substrate of dielectric material or dielectric coated material,
a plurality of particles, each particle comprising one or more colored sectors, each sector associated with an embedded electromagnetic charge;
one or more electrodes bonded to the substrate, each having a variable electromagnetic charge, wherein each of said electrodes faces at least one corresponding colored sector on a particle, said corresponding sector on said particle being one of said plurality of sectors, each of said one or more electrodes configured to interact with said corresponding colored sector on said particle, wherein interacting includes moving said particle; and
an energy source connected to the one or more electrodes via conductive elements, for changing the variable electromagnetic charges of the one or more electrodes.

2. The display of claim 1 wherein each particle is encased in a transparent shell.

3. The display of claim 1 wherein each particle is encased in a transparent shell and surrounded by a lubricant.

4. The display of claim 1 wherein each particle is microscopic in size.

5. The display of claim 1 wherein each particle has a shape selected from the group consisting of spherical, egg-shaped, oval, cubical, rounded cubicle, and oblong.

6. The display of claim 1 wherein the number of said one or more colored sectors of the plurality of particles is no less than two and no greater than six.

7. The display of claim 1 wherein each of the particles is colored black and white.

8. The display of claim 1 wherein each of the particles is colored primary colors.

9. The display of claim 1 wherein some of the particles are colored black and white and other particles are colored primary colors.

10. The display of claim 1 wherein the particles comprise a solid interior colored ball and a material that can convert from a solid to a liquid, both encased within a transparent shell.

11. A dynamically variable graphic display comprising an arrangement of:
a plurality of microspheres;
each microsphere consisting of one or more colored sectors;
each sector having an embedded electrical or magnetic charge;
one or more electrodes bonded to a substrate for each microsphere, each of said one or more electrodes having an electrical charge;
the substrate being a dielectric material or dielectric coated material;
each electrode positioned for interaction with one of the microspheres;
each of said one or more electrodes connected to a microswitch;
each microswitch connecting a circuit; and
an energy source connected to the circuit via conductive elements, said energy source for changing the electrical charge of the one or more electrodes.

12. The display of claim 11 wherein each microsphere is encased in a transparent shell and surrounded by a lubricant.

13. The display of claim 11 wherein the number of said one or more colored sectors of the plurality of microspheres is no less than two and no greater than six.

14. The display of claim 11 wherein the microspheres each comprise a solid interior colored ball and a material that can convert from a solid to a liquid, both encased within a transparent shell.

15. A dynamically variable graphic display comprising an arrangement of:
a plurality of particles, each of said plurality of particles having a body shape selected from the group consisting of a cylinder, an ellipsoid, and a cylinder with rounded edges at each end of its primary axis;
each of said plurality of particles consisting of one or more colored sectors;
each sector having an embedded electrical charge;
one or more electrodes per particle, each electrode having a variable electrical charge;
each electrode adjacent to a paired particle of said plurality of particles;
an energy source connected to the one or more electrodes via conductive elements for changing the electrical charge of the electrodes; and
a substrate composed of a dielectric material or dielectric coated material, said substrate comprising a panel within which the plurality of particles and one or more electrodes are situated.

16. The display of claim 15 wherein each particle is encased in a transparent shell.

17. The display of claim 15 wherein the number of said one or more colored sectors of the plurality of particles is no less than two and no greater than six.

18. The display of claim 15 wherein the particles each comprise a solid interior colored ball and a material that can convert from a solid to a liquid, both encased within a transparent shell.

19. A dynamically variable graphic display comprising an arrangement of:
a plurality of particles, each of said plurality of particles having a body shape selected from a group consisting of a cylinder, an ellipsoid, and a cylinder with rounded edges at each end of its long axis;

each particle consisting of one or more colored sectors;

each sector having an embedded electrical or electrostatic charge;

each particle inside a hollow transparent tube;

one or more electrodes bonded to a the back side of the transparent tubes;

each electrode having a variable electric charge and positioned immediately adjacent to one of said particles;

an energy source connected to the electrodes for changing the variable electrical charge of each of the one or more electrodes; and a substrate composed of a dielectric material or dielectric coated material, said substrate comprising a panel within which the plurality of particles and one or more electrodes are situated.

20. The display of claim 19 wherein each particle is encased in a transparent shell and surrounded by a lubricant.

21. The display of claim 19 wherein the number of said one or more colored sectors of the plurality of particles is no less than two and no greater than six.

22. The display of claim 19 wherein the particles comprise a solid interior colored ball and a material that can convert from a solid to a liquid, both encased within a transparent shell.

* * * * *